United States Patent [19]

Farris

[11] Patent Number: 4,768,645
[45] Date of Patent: Sep. 6, 1988

[54] CONVEYOR BELT SCRAPING APPARATUS

[76] Inventor: Sammy D. Farris, P.O. 682, Lynch, Ky. 40855

[21] Appl. No.: 16,856

[22] Filed: Feb. 20, 1987

[51] Int. Cl.[4] ............................................. B65G 45/00
[52] U.S. Cl. .................................... 198/499; 15/256.5
[58] Field of Search ............... 198/497, 499; 15/256.5, 15/256.51, 256.52

[56] References Cited

U.S. PATENT DOCUMENTS

| | | | |
|---|---|---|---|
| 3,292,201 | 12/1966 | Bedard | 15/256.51 |
| 3,301,214 | 1/1967 | Coghill | 15/256.51 |
| 3,722,667 | 3/1973 | Olson | 198/499 |
| 3,782,534 | 1/1974 | Holleman | 198/499 |
| 3,859,691 | 1/1975 | Katayama et al. | 15/256.51 |
| 3,994,385 | 11/1976 | Reiter | 198/499 |
| 4,189,046 | 2/1980 | Ward et al. | 198/499 |
| 4,265,358 | 5/1981 | Veenhof | 198/499 |
| 4,352,425 | 10/1982 | Childress et al. | 198/499 |
| 4,489,823 | 12/1984 | Gordon | 198/499 |
| 4,533,036 | 8/1985 | Gordon | 198/499 |

FOREIGN PATENT DOCUMENTS

| | | | |
|---|---|---|---|
| 0509311 | 7/1939 | United Kingdom | 198/499 |
| 0517745 | 2/1940 | United Kingdom | 198/499 |
| 2053121 | 2/1981 | United Kingdom | 198/499 |
| 1585350 | 2/1981 | United Kingdom | 198/499 |
| 1034967 | 8/1983 | U.S.S.R. | 198/499 |

OTHER PUBLICATIONS

PCT Document No. 84/04516, Meijer, 22 Nov. 1984, (22.11.84), (See Abstract).
Richwood Industries brochure, "The Shape of the Future for Conveyor Belt Cleaning".
Hosch Installation and Operating Instructions.
ASGCO Brochure "Innovative Answer to Your Belt Cleaning Problems . . . ".

Primary Examiner—Robert J. Spar
Assistant Examiner—D. Glenn Dayoan
Attorney, Agent, or Firm—King & Schickli

[57] ABSTRACT

A conveyor belt scraping apparatus includes a pair of scraper blades connected to a pivoting mounting member. The upstream blade is oriented so as to engage the belt at substantially a 50° angle while the downstream blade is oriented substantially perpendicular to the belt. The scraping pressure applied to each blade is controlled by a pair of actuator cylinders connected between a rigid frame and the pivotal blade mounting member. By extending or retracting piston rods of the cylinders, pressure on one blade is increased while pressure on the other blade is reduced. The blade scraping pressure is adjusted in this manner to provide the best scraping action. The apparatus also includes a mechanical back-up system to provide scraping pressure to the blades in the event the actuator cylinders fail. Further, the apparatus includes a switch that is connected to the conveyor controller. When the conveyor controller is operated to run the conveyor in reverse, the switch closes causing the scraper blades to be pivoted free of and fully disengaged from the conveyor belt. In this way damage to the blades from roll back is avoided.

7 Claims, 3 Drawing Sheets

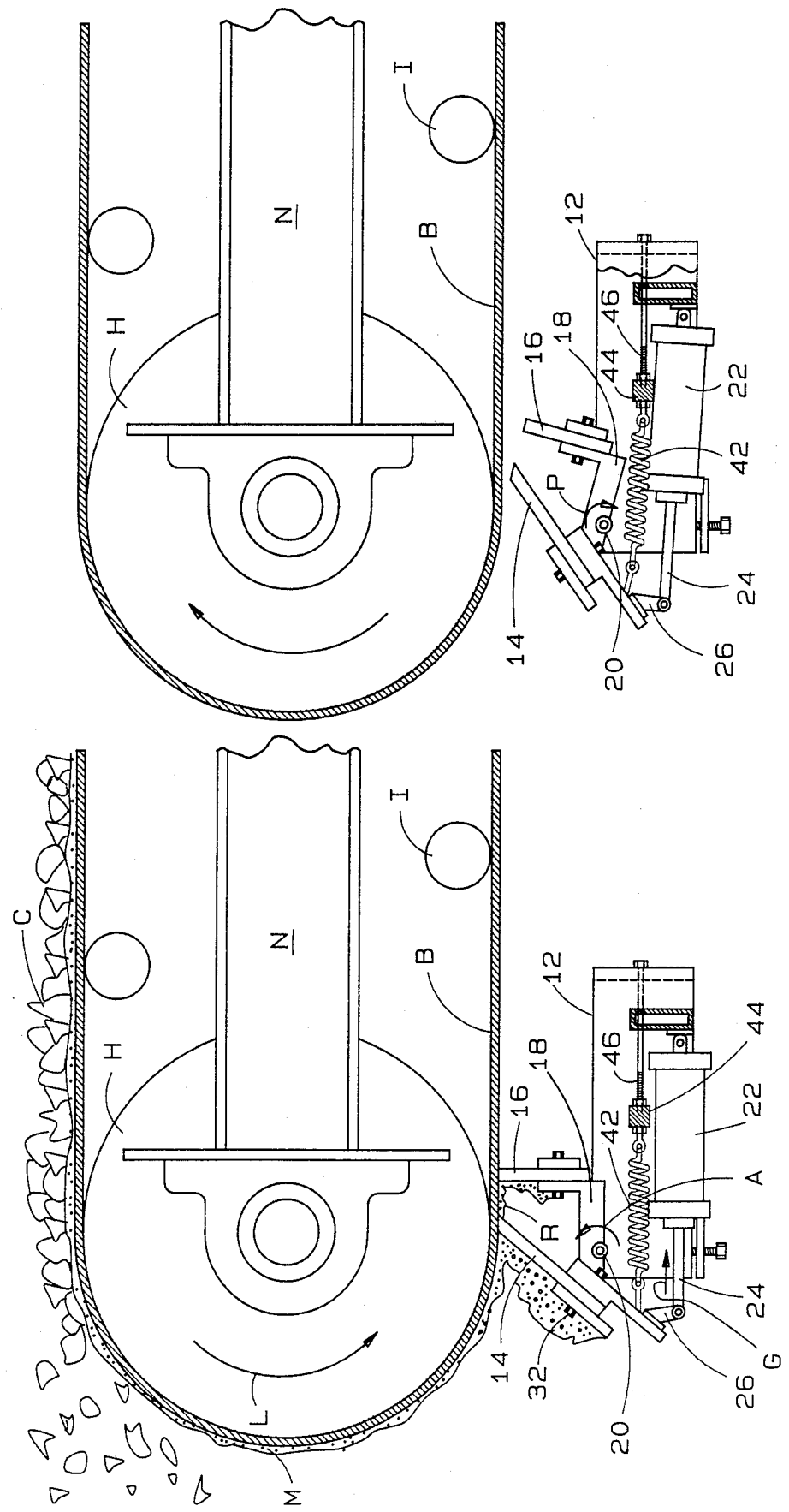

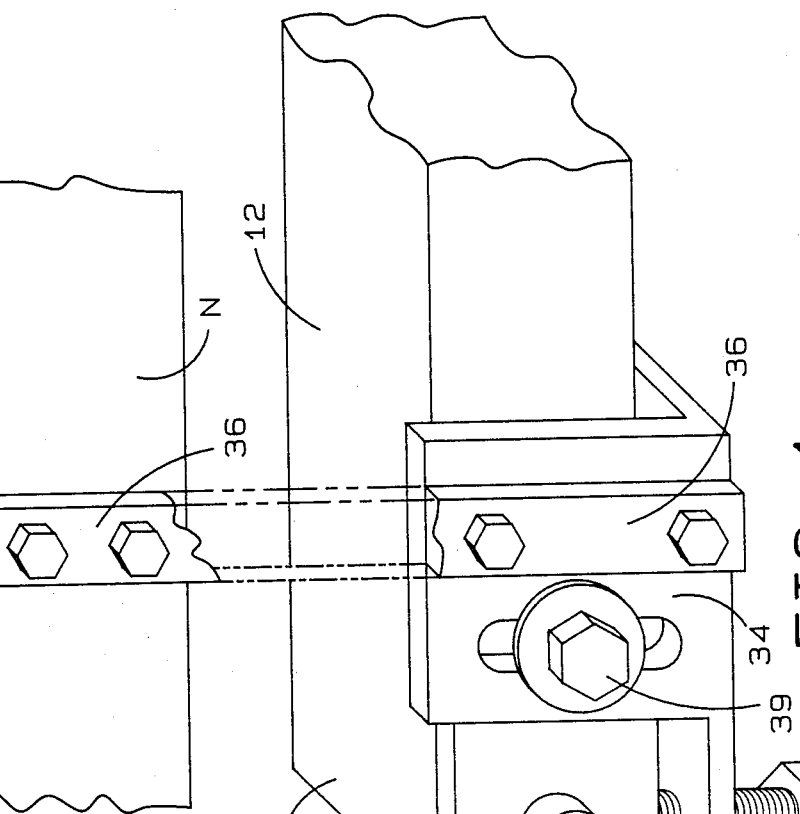
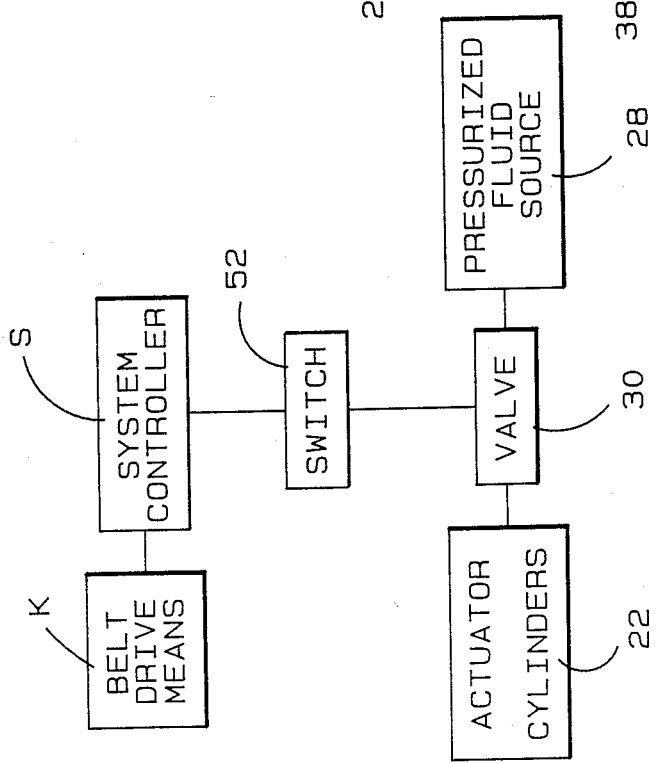
FIG. 4
FIG. 3

CONVEYOR BELT SCRAPING APPARATUS

BACKGROUND OF THE INVENTION

The present invention relates generally to the conveying field and, more particularly, to an improved apparatus that effectively and efficiently scrapes carry back material from a conveyor belt during relative forward movement of the belt.

Endless belt conveyors are well known in the art. The belt is stretched in an endless path between two main support rolls, and is usually driven by the roll near the discharge end of the conveyor. The belt may be formed of coated or impregnated plastic fabric. Idler roller assemblies guide and support the belt throughout its length.

Where bulk materials are being conveyed, the idler assemblies may form a trough of the carrying side of the belt. More specifically, at each support location three idler rollers may be utilized. The middle roller is level and the side rollers are directed upwardly and inclined at an angle of, for example, 25°. In this manner, the belt is provided with a substantially U-shaped cross section to better maintain the bulk material on the belt during conveying. In addition, other idler assemblies engage the bottom face of the belt as it travels along an underlying return run in the reverse direction. These idler assemblies also serve to maintain proper alignment of the belt during conveyor operation.

Due to outstanding reliability and efficiency, belt conveyors have been found to be particularly useful in conveying large quantities of bulk material from place to place. Thus, belt conveyors have a wide range of applications. For example, a series of belt conveyors may be utilized to convey coal from a shuttle car, scoop or tractor trailer dumping station in an underground mine to a storage bin or coal pile at the surface.

A primary concern in underground mining relates to the suppression of coal dust. This is because inhalation of coal dust over a long period of time may lead to the serious health affliction known as black lung. Additionally, it should be recognized that coal dust is explosive and when present in certain quantities in air can be ignited by a spark. Thus, in order to improve safety, dust allaying equipment is provided to spray foam or water on the aggregate coal where coal is put on a conveyor system as well as where coal is transferred from one conveyor to another.

The foam bubbles or water droplets mix with the fine particles of coal and other dust in the mine to create a mud or slurry that tends to stick or cake to the conveyor belt. Upon reaching the discharge end of the conveyor, the endless belt travels around the end roll of the conveyor to the return run. The aggregate coal is discharged from the belt at this time, but the wet, fine particles and dust often remain stuck to the belt. This "carry back material" may build up on the idler assembly rollers that support the material carrying face of the belt along the return run. Often, the build-up of material on these idlers is uneven resulting in the application of uneven guiding pressure to the belt. Eventually this condition may lead to belt misalignment that adversely affects the efficient operation of the conveyor. Where, in fact this condition becomes severe, the belt could become damaged resulting in the costly closing down of the conveyor for repairs.

It should also be appreciated that the carry-back material has a gritty, abrasive character. Thus, when disposed between an idler and the belt, overall wear of the belt is greatly increased. This, of course, results in reduced belt surface life.

As a further consideration, carry back material stuck to the conveyor belt adds weight to the belt. On relatively long endless belt conveyors this added weight can lead to a substantial increase in the power requirements for operation. Further, it reduces the capacity of the conveyor to convey aggregate coal thereby reducing operating efficiency.

Recognizing these shortcomings, several systems have been developed for removing carry back material from a conveyor belt during conveyor operation. One such belt scraper is manufactured by Richwood Industries, Inc. and sold under the trademark COMBI-T. This system utilizes dual scraper blades in combination with a center roller. While this system effectively cleans carry back material from a conveyor belt under numerous operating conditions, it is not as effective in cleaning as desired where the carry back material is relatively heavy.

More specifically, both the upstream and downstream scraper blades are oriented perpendicular to the surface of the conveyor belt with scraping pressure applied equally on each blade. Where the carry back material is heavy, the upstream blade removes only a portion of the carry back material and actually tends to grind the remainder of the carry back material into the surface of the belt including the pores. Disadvantageously, this results in excessive wear of the belt coating and fabric that could preferably be avoided.

It should also be recognized that the COMBI-T scraper fails to provide any the air shocks that apply scraping pressure to the scraper blades. In the adverse operating conditions existing in an underground mine, it is not unusual to suffer a loss of air pressure through hose or, air cylinder failure. Disadvantageously, with the COMBI-T scraper system, such a loss of pressure would mean that the conveyor belt would have to be shut down until repairs could be made to the air system. Alternatively, continued operation of the conveyor belt would be possible, but there would be no effective, operational scraper system. As a result, continued operation is only possible while suffering all the disadvantages noted above with respect to carry back material build-up on a conveyor belt.

SUMMARY OF THE INVENTION

Accordingly, the primary object of the present invention is to provide an apparatus for scraping carry back material from a conveyor belt overcoming the above-described limitations and disadvantages of the prior art.

Another object of the present invention is to provide a conveyor belt scraping apparatus of improved efficiency and effectiveness in scraping carry back material from the conveyor belt during relative forward movement of the belt.

Still another object of the invention is to provide a conveyor belt scraping apparatus for more effectively cleaning carry back material from the belt without grinding the material deep into the belt during cleaning. In this way, abrasive wear of the belt including the fabric and coating is reduced and belt service life is thereby extended.

Yet another object of the present invention is to provide an apparatus for scraping carry back material from a conveyor belt that includes a mechanical back-up system to furnish more reliable operation even under adverse conditions as found in an underground mine.

Still another object of the present invention is to provide a conveyor belt scraping apparatus including a mechanism for relative disengaging of the scraper apparatus and the belt when the conveyor belt is stopped or reversed so as to prevent damage to the scraper blades.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for scraping carry back material from a conveyor belt during relative forward movement of the belt. The conveyor belt scraping apparatus includes first and second scrapers in the form of blades made of neoprene or other hard rubber material. The first or upstream blade is adapted for removing relatively heavy, built-up carry back material from the belt. The second or downstream blade is adapted to remove residual carry back material from the belt left after scraping with the first blade.

The scraper blades are biased against the conveyor belt with scraping pressure by means of an actuator cylinder. The actuator cylinder is connected to a pressurized fluid source through a flow control valve. The valve may be manually adjusted to provide the best possible cleaning action.

Preferably, the scraper blades are each connected to a mounting member pivotally secured to a frame of the belt scraping apparatus. The actuator cylinder is pivotally secured to the frame with the piston rod pivotally connected to the mounting member. When the piston rod is retracted, the mounting member pivots so that the scraping pressure on the downstream blade is increased while scraping pressure on the upstream blade is decreased. Conversely, when the piston rod is extended, the mounting member pivots in the reverse direction so that scraping pressure on the downstream blade is reduced while scraping pressure on the upstream blade is increased. In this way, the actuator cylinder may be utilized to modulate the scraping pressure on each blade for the best possible cleaning of carry back material from the belt.

More specifically, the upstream scraper blade is oriented at an angle of substantially 50° with respect to a plane containing the conveyor belt. In addition, the downstream blade is oriented substantially perpendicular to the conveyor belt. By adjusting the scraping pressure of the two blades against the conveyor belt at these angles, the upstream blade effectively removes heavy, built-up carry back material from the belt. This is done at a relataively low scraping pressure so that the innermost layers of material remaining on the belt are not ground deep into the surface and pores of the belt. The residual innermost layers are then relatively easily removed by the downstream blade working at a relatively high scraping pressure. Since the carry back material is not initially ground into the belt, abrasion of the belt coating and fabric is substantially minimized during scraping. Further, better cleaning of the residual material from the belt with the second, downstream blade is also possible.

The relationship of the relative scraping pressure between the upstream and downstream blades as well as the angles of contact of the blades with the conveyor belt is also adjustable for maximum flexibility and performance. This may be done by adjusting the relative distance between the belt engaging edge of the upstream blade and the belt.

More specifically, the distance between the pivotal axis of the blade mounting member and the belt surface may be adjusted by simply turning two adjustment bolts at the front end of the frame. When the distance between the two is reduced, the angle of engagement between the front blade and the conveyor belt is reduced and the scraping pressure is increased. Additionally, the scraping pressure of the downstream blade is reduced. Such a setting may be desired under certain operating conditions as, for example, where the carry back material is not so heavy.

In contrast, it is also possible to increase the distance between the pivotal axis and the belt surface. When this is done, the scraping pressure of the upstream blade is reduced while the pressure on the downstream blade is increased. Similarly, the angle of engagement between the upstream blade and the conveyor belt is increased from the preferred 50°. Where the carry back material is particularly heavy and added scraping pressure is desired on the downstream blade, it may be desirable to utilize this setting.

The same adjustments described above may also be made to correct for wear of the blades. By adjusting the height the blades may be brought back into proper orientation for the most effective and efficient scraping action.

In accordance with yet another aspect of the present invention, the conveyor belt scraping apparatus includes a backup system of at least one coil spring connecting the pivotal mounting member of the scraper blades to a tensioning bar connected to the support frame. In order to assure even scraping pressure across the entire width of each scraper blade and to assist in preventing blade chatter, even during normal operation, the tensioning bar may be connected at spaced intervals across the width of the mounting member by a series of coil springs. The springs are connected to the mounting member so as to be overridden by the pressure action of the cylinder during normal operation, but provides the backup system for maintaining scraping pressure on the scraper blades if the actuator cylinder fails.

Preferably, the tensioning bar threadedly engages a center adjusting rod mounted to the support frame. Thus, by rotating the rod one direction or the other, the tension and, therefore, the scraping pressure provided by the back up system through the coil springs may be increased or decreased. There are guide rods provided adjacent the ends of the tensioning bar. These rods pass through and are fixedly attached to the support frame, and extend through apertures adjacent each end of the tensioning bar. Nuts that threadedly engage the guide rods may be utilized to lock the ends of the tensioning bar in position following adjustment of the tension by means of the center adjusting rod. In this way, flexing of the tensioning bar is minimized, and even scraping pressure and reduced tendency of blade chatter across the full width of the scraping blades is further assured.

In accordance with still another aspect of the present invention the scraper blades may also be completely disengaged from the conveyor belt. This is also done by means of operation of the actuator cylinder. When the piston rod is fully extended, the mounting member is pivoted so that both blades are removed from engagement with the conveyor belt. Thus, when the direction of operation of the belt conveyor is reversed as, for example, to convey rock dust back along a mine section, the blades may be fully disengaged from the belt to prevent any possibility of damage to the blades.

Still other objects of the present invention will become readily apparent to those skilled in the art from the following description wherein there is shown and described the preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 2 is a schematical side elevational view partially in sections showing the scraper apparatus engaged against the conveyor belt;

FIG. 2a is a view similar to FIG. 2 but showing the conveyor belt scraping apparatus disengaged from the conveyor belt;

FIG. 3 is a schematical block diagram showing the control circuit of the present invention; and FIG. 4 is a cutaway side elevational view in detail showing an alternative embodiment of the present invention including a mechanism for adjusting the distance between the pivotal axis of the scraper blade mounting member and the conveyor belt.

Figure 1:
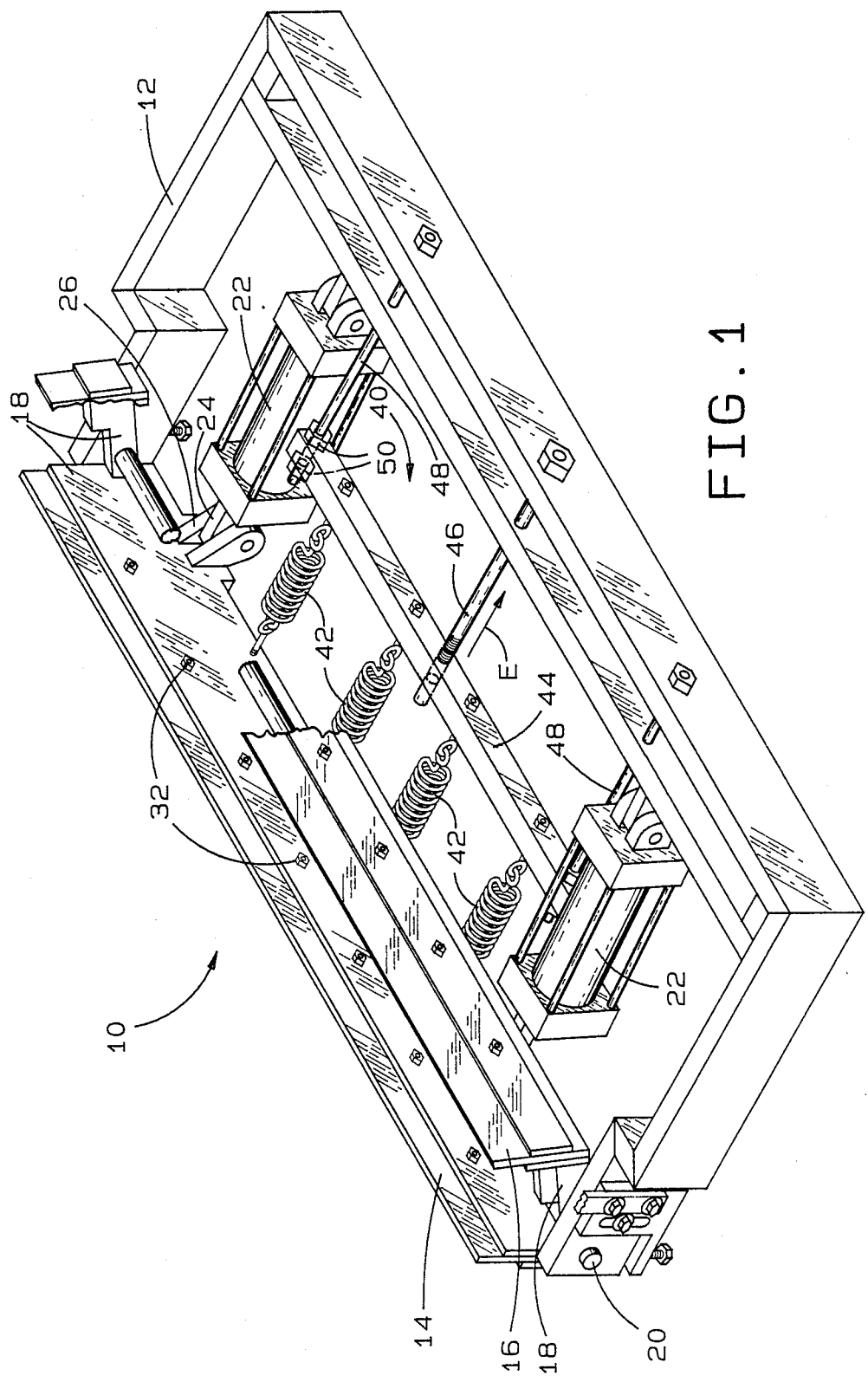
FIG. 1 is a partially broken-away perspective view of the conveyor belt scraping apparatus of the present invention.

Reference will now be made in detail to the present, preferred embodiment of the invention, an example of which is illustrated in the accompanying drawing.

DETAILED DESCRIPTION OF THE INVENTION

Reference is now made to FIG. 1 showing the conveyor belt scraping apparatus 10 of the present invention. The apparatus 10 is particularly adapted for effectively and efficiently scraping carry back material from the conveyor belt during relative forward movement of the belt.

The apparatus 10 includes a frame 12. First and second scrapers 14, 16 are mounted to the frame 12 by means of a mounting member or cradle 18. Each of the scrapers 14, 16 is shown in the form of a blade formed of a hard rubber material such as neoprene to provide superior scraping action and wear resistance for a longer service life.

As shown, the mounting member 18 is attached to the frame 12 by means of a shaft 20 that is pivotally received at each end in the frame. The pivotal movement of the mounting member 18 and, therefore, the scrapers 14, 16 are controlled by means of actuator cylinders 22. As shown in FIG. 1, two cylinders 22 are pivotally mounted to the frame 12 at laterally spaced locations. The piston rod 24 of each cylinder 22 is pivotally secured to a lug 26 extending from the mounting member 18. By connecting the piston rods 24 to the mounting member 18 adjacent the two ends of the member, even scraping pressure across the full width of the blades 14, 16 is assured for good scraping action.

The cylinders 22 are each connected to a pressurized fluid source 28, such as an air compressor, through the flow or pressure control valve 30 (note FIG. 3). The valve 30 is adjusted manually to retract or extend the piston rods 24 into or from the cylinders 22. When the rods 24 are retracted, the scraper blades 14, 16 are pivoted forwardly (note action arrow A in FIG. 2). Scraping pressure is reduced on the upstream blade 14 while being increased on the downstream blade 16, as will be described more in detail below. Conversely, when the rods 24 are extended, the scraper blades 14, 16 are pivoted rearwardly (note action arrow P in FIG. 2A) and scraping pressure is increased on the upstream blade 14 while being reduced on the downstream blade 16.

As aggregate coal C is delivered onto the moving conveyor belt B, it is sprayed with water to suppress dust. During the time the coal is conveyed to the discharge end of the conveyor, water droplets percolate down through the aggregate coal C carrying fine particles of coal as well as other material and debris to the belt surface. Upon reaching the discharge end, the endless belt B travels around the head roll H of the conveyor and then back along the underlying return run. At this time, the aggregate coal C is discharged from the end of the conveyor as shown in FIG. 2. The fine particles and other debris carried to the surface of the belt B by the water, however, tend to form a slurry or mud that sticks to the belt (note carry back material M in FIG. 2).

If not properly removed, this carry back material M builds up on the idlers I supporting and guiding the belt B along the return run. Where material build-up on the idlers I is uneven, an uneven guiding pressure is applied to the belt B. Consequently, the belt B may be misdirected causing belt misalignment problems. Advantageously, these problems are avoided by utilizing the apparatus of the present invention.

With the belt B being driven in the forward direction (note action arrow L), the scraper blades 14, 16 are pivoted so as to engage the belt as shown in FIG. 2. The upstream blade 14 is oriented for engagement at substantially the bottom center of the head roll H at an angle of approximately 50°. The mounting member 18 is substantially horizontal (see FIG. 2) and the blade 16 is oriented so as to engage the belt B at an angle of substantially 90° approximately 6–12" downstream of the blade 14. As previously indicated, the scraping pressure applied to each of the blades 14, 16 is controlled by regulating the pressure to the actuator cylinders 22. The flow or pressure control valve 30 is adjusted manually by the conveyor operator to extend or retract the piston rods 24 with increased or decreased pressure and provide the scraping pressure producing the best results.

When the carry back material M is relatively heavy as shown in FIG. 2, the scraping pressure on the upstream blade 14 is reduced and the scraping pressure on the downstream blade 16 is increased (i.e. the piston rods 24 are retracted in the direction of action arrow G). That is, the member 18 pivots on the shaft 20 at a mid-point causing the blade 14 in front or upstream of the pivot to move downwardly and away from the belt B. This forward pivoting action, at the same time causes the downstream blade 16 to move upwardly and toward the belt.

The operative pressure of the cylinder 22 overrides the constant pressure provided by back-up springs 42, which will be described more in detail below. The spring tension, however, effectively provides stabilizing action during normal operation, and reduces any tendency of the blades 14, 16 to chatter. The end result is the relatively low pressure on the blade 14 combines with the angle of engagement of the blade 14 with the belt B (approximately 50°) to remove the heaviest material without pressing and grinding the residual material R deep into the belt surface and pores. The cleaning action is accomplished without undue or unnecessary friction and wear to the scraper blades 14, 16 or the conveyor belt B.

Since the residual material R is not ground deep into the belt surface by the upstream blade 14 as with prior art dual scraper blade devices, the residual material is easier to remove from the belt by the downstream blade 16 that has increased pressure engagement. As a result, an efficient, clean sweeping action is provided by the downstream blade 16 which is oriented substantially perpendicular to the belt and subjected to a relatively high scraping pressure for maximum effectiveness.

When the carry back material M is not as heavy, less blade pressure is required to effectively scrape the material from the belt B. In this situation, the control valve 30 is adjusted to extend the piston rods 24 to bias the blades. This not only serves to reduce the scraping pressure on the downstream blade 16, but also increase the pressure on the upstream blade 14. In addition, the angle of engagement between the upstream blade 14 and the belt B is reduced slightly so as to present more of an edge to the belt at the point where the belt is fully backed by the head roller E. In this mode of operation, the springs 42 counterbalance a portion of the fluidized pressure of the cylinder 22.

When adjusted in the manner just described, the apparatus 10 of the present invention provides very effective cleaning of either relatively heavy or relatively light carry back material M from the conveyor belt B while also reducing drag on the belt as well as wear on the belt and scraper blades 14, 16. In effect, the baldes 14, 16 are moved relative to each other to selectively increase or decrease the relative scraping pressure against the belt to provide respective light and heavy scraping action.

The apparatus 10 of the present invention may also be adjusted to provide the same high quality scraping action even after the blades 14, 16 are considerably worn. As the blades 14, 16 wear, the angle of engagement between the upstream blade 14 and the belt B steadily increases from substantially 50° to approximately 90°. With this change in angle, there is a loss in the desired scraping action, but the belt continues to be cleaned.

In order to restore the scraping efficiency and effectiveness of the embodiment shown in FIG. 1, the distance between the upstream blade 14 and the conveyor belt B is adjusted. More specifically, the bolts 32 holding the forward blade 14 to the mounting member 18 are loosened. The blade 14 is then shifted upwardly toward the belt B to the desired height. Then the bolts are retightened to hold the blade in position.

In the alternative embodiment shown in FIG. 4 which may be preferred by some mine operators, the relative distance between the shaft 20 (i.e. the axis of rotation of the blade mounting member 18) and the belt B may be adjusted. As shown, the frame 12 is supported at least at each front corner (only one corner shown in detail in figure) by means of a bracket 34 rigidly mounted to the conveyor frame N by a hanger 36. A bolt 37 is positioned at each front corner of the bracket 34. The bolts 37 are threaded through the bottom rail 38 of the bracket 34 with the ends of the bolts engaging the frame 12. Thus, if locking bolts 39 (only one shown) are loosened, the adjusting bolts 37 can be rotated and the frame 12 is raised relative to the belt B. In this way the distance between the top of the upstream blade 14 and the belt B is reduced. By reducing this distance, the angle of engagement of a worn, upstream blade 14 with the belt B may be restored to the desired 50°.

In the event the pneumatic cylinders 22 or any other component of the pressurized air system fails, scraping pressure is still maintained evenly across the scraper blades 14, 16 through the mechanical backup system generally designated by reference numeral 40 and incorporating the springs 42. Each spring 42 is connected at one end to the pivotal mounting member 18. The opposite ends of the springs 42 are connected to a tensioning bar 44. The tensioning bar 44 includes a threaded aperture that meshes with a threaded tension adjusting bolt or rod 46 connected to the frame 12. In addition, guide rods 48 also mounted to the frame 12 pass freely through apertures adjacent the two ends of the tensioning bar 44. Thus, the tensioning bar 44 is maintained in proper alignment with the pivotal blade mounting member 18 at all times.

As should be appreciated, the spring tension and, thereby the scraping pressure applied to the blades 14, 16 by means of the springs 42 may be adjusted by rotating the rod 46. If the rod 46 is turned in a clockwise direction, the tensioning bar 44 is moved in the direction of action arrow E to increase the tension and, therefore, the scraping pressure of the blade 16. Conversely, if the rod 46 is turned in a counterclockwise direction, the tensioning bar 44 is moved in the opposite direction so as to reduce the spring tension and, thus, the scraping pressure of the blade 16.

In order to ensure that even tensioning pressure is generated across the entire width of the tensioning bar 44, the guide rods 48 are threaded to receive locking nuts 50. The nuts 50 are loosened from the sides of the tensioning bar 44 as the tension is adjusted utilizing the adjusting rod 46. During adjustment, the ends of the bar move freely along the guide rods 48. Once the desired tension is applied to the springs 42, the lock nuts 50 are again tightened against the sides of the bar 44 to secure the bar from flexing during the scraping operation. In this way, the springs 42 maintain a constant, stabilizing pressure on the blades 14, 16 at all times and even distribution of pressure across the full width of the scraper blades 14, 16 is always assured.

In mining, it is often desirable to run a conveyor in reverse in order to deliver roof bolts, rock dust and other supplies down along a mine section. As a further feature of the present invention, the blades 14, 16 are automatically fully disengaged from the conveyor belt B whenever the belt is run in reverse (see FIGS. 2A and 3). More specifically, when the conveyor belt system controller S is operated to engage the belt drive motor K in reverse, a switch 52 connected to the control S is closed. The flow control valve 30 is operative in response to the closing of the switch 52 to cause the piston rods 24 to be fully extended from the cylinders 22. Thus, the blades 14, 16 are pivoted in the direction of action arrow P until completely free of the belt B. Any possible damage to the blades 14, 16 from roll back or to any seams in the belt B from running the belt over the blades in the reverse direction is therefore avoided.

In summary, numerous benefits have been described resulting from employing the concepts of the present invention. Advantageously, the present invention provides an apparatus exhibiting improved scraping action. By more effectively and efficiently removing carry back material M from a belt B, belt alignment problems are avoided. Further, by reducing the amount of fine particles and grit that are ground deeply into the belt during scraping, excessive wear is eliminated and belt life is increased.

The cylinders 22 are operative to provide the desired modulated pressure of the blades 14, 16 against the belt B. The springs 42 serve to assist the cylinders 22 in stablizing the mounting member 18 minimizing the tendency of the blades 14, 16 to chatter. The cylinders override the action of the springs to provide a fine tuned control through operation of the valve 30. The improved scraping action provided by better control reduces the weight of carry back material on the belt. Thus, more efficient conveyor operation is possible with substantially the full capacity of the belt being utilized to convey aggregate bulk material.

The present invention also includes a mechanical backup system 40 that includes the springs 42 to maintain proper, equal pressure on the scraping blades 14, 16 even if the pressurized fluid biasing system fails. In this way, possible damage to the belt B as well as to scraper blades 14, 16 in the event of failure is avoided. Further, operation of the conveyor belt system may be continued with positive scraping action even as the pressurized fluid system is being repaired. Thus, conveyor down time is reduced as is overall coal production cost. Additionally, the conveyor belt scraping apparatus of the present invention includes a switch 52 that is closed when the conveyor belt is operated in reverse. The closing of the switch causes the scraper blades 14, 16 to pivot and disengage from the belt B. In this way, possible damage to the scraper blades 14, 16 and belt B from operation of the conveyor in the reverse direction is avoided.

The foregoing description of the preferred embodiments of the invention has been presented for purposes of illustration and description. It is not intended to be exhaustive or to limit the invention to the precise form disclosed. Obvious modifications or variations are possible in light of the above teachings. For example, the conveyor belt scraping apparatus of the present invention could be controlled by a microprocessor connected to pressure transducers on the scraping blades and carry back material sensors. Such a microprocessor would be capable of modulating the belt scraping pressure to provide the best possible scraping action even under continuously varying conditions. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. An apparatus for scraping carry back material from a conveyor belt during relative forward movement of said belt, comprising:

scraper means for contacting the conveyor belt, said scraper means including a first blade mounted at a first angle so as to be adapted for removing relatively heavy, built-up carry back material from said belt and a second blade mounted at a second angle so as to be adapted for removing residual carry back material from said belt following scraping by said first blade;

means for biasing said scraper means against said conveyor belt with scraping pressure and moving the blades to selectively increase and decrease the relative scraping pressure against the belt to provide respective light and heavy scraping action;

means for disengaging said scraper means from said conveyor belt; and back-up means for maintaining scraping pressure even if said biasing means fails.

2. The conveyor belt scraping apparatus set forth in claim 1, further comprising a frame and a scraper mounting member to which said first and second scrapers are connected, said mounting member being pivotally secured to said frame.

3. The conveyor belt scraping apparatus set forth in claim 1, wherein said first scraper is oriented at an angle of substantially 50° with respect to a plane containing said conveyor belt and said second scraper is oriented substantially perpendicular to said plane.

4. The conveyor belt scraping apparatus set forth in claim 1, wherein said biasing means including an actuator cylinder connected to said scraper means for moving said blades together.

5. The conveyor belt scraping apparatus of claim 1, wherein said back-up system comprises a tension adjusting means and at least one coil spring connecting said scraper means to said tension adjusting means so as to provide tension for back-up scraping pressure.

6. The conveyor belt scraping apparatus of claim 5, wherein said tension adjusting means includes a tensioning bar and an adjusting rod, said tensioning bar being threadedly received on said adjusting rod.

7. The conveyor belt scraping apparatus of claim 6, further comprising a guide rod slidably received through an aperture adjacent each end of said tensioning bar, said guide rod including locking means to lock the ends of said tensioning bar,in position and thereby assure even tensioning to and scraping pressure across the entire width of said scraper means against said conveyor belt.

* * * * *